(12) United States Patent
Hershey et al.

(10) Patent No.: US 6,668,012 B1
(45) Date of Patent: Dec. 23, 2003

(54) IDENTIFICATION OF AN IDENTIFIABLE CODE SEQUENCE IN A RECEIVED SIGNAL BY CORRELATION WITH SUMMED DIFFERENT-PHASE REPLICAS OF THE SEQUENCE

(75) Inventors: John Erik Hershey, Ballston Lake, NY (US); Richard August Korkosz, Rotterdam Junction, NY (US); Gary Jude Saulnier, Rexford, NY (US); Naofal Mohammed Wassel Al-Dhahir, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/353,655

(22) Filed: Jul. 15, 1999

(51) Int. Cl.[7] .......................... H04L 27/30; H04L 27/06
(52) U.S. Cl. ...................... 375/150; 375/149; 375/152; 375/343
(58) Field of Search ................................. 375/150, 343, 375/149, 152; 455/502, 423; 370/320

(56) References Cited

U.S. PATENT DOCUMENTS

| | | | | | |
|---|---|---|---|---|---|
| 5,313,457 | A | * | 5/1994 | Hostetter et al. | 370/320 |
| 5,414,729 | A | * | 5/1995 | Fenton | 375/149 |
| 6,141,374 | A | * | 10/2000 | Burns | 375/152 |
| 6,272,189 | B1 | * | 8/2001 | Garin et al. | 375/343 |

* cited by examiner

Primary Examiner—Stephen Chin
Assistant Examiner—Edith Yeh
(74) Attorney, Agent, or Firm—Duane Morris LLP

(57) ABSTRACT

A receiver for a unique word sequence or a spreading code sequence includes a memory which is preloaded with all possible phases of the code. The sequence in the received signal is correlated, in parallel, with sums of various ones of the different phases of the code. Thus, the received code is correlated with all possible phases of a replica of its own code. Consequently, one of the sums will exhibit a correlation peak, which indicates that the desired phase of the code is included in that particular sum. The other sums will not exhibit a correlation peak, and are is discarded. The different phases in the one sum which displayed correlation are divided into new sums, each having fewer phases, and the correlation is again performed. Again, those sums exhibiting no correlation are discarded, and the sum exhibiting correlation is divided into sums of fewer codes.

12 Claims, 2 Drawing Sheets

IDENTIFICATION OF AN IDENTIFIABLE CODE SEQUENCE IN A RECEIVED SIGNAL BY CORRELATION WITH SUMMED DIFFERENT-PHASE REPLICAS OF THE SEQUENCE

FIELD OF THE INVENTION

This invention relates to acquisition of control or other information signals which included an identifiable code sequence such as a direct spreading sequence.

BACKGROUND OF THE INVENTION

It is often necessary to detect, acquire, and track the frequency and time of a received direct-sequence spread-spectrum (DS/SS) signal or of a unique-word message preamble in order to reliably de-spread andor demodulate the received signal. In direct-sequence spread-spectrum, the transmitted information bits are multiplied or spread by a high rate pseudorandom (PN) spreading sequence.

In many DS/SS systems, detection and acquisition of received signal timing and frequency is difficult because the signal energy is well below the associated noise level. In code-division multiple access systems in which multiple users access the same frequency bandwidth by use of different spreading codes having advantageous cross-correlation properties, the noise contribution from the codes of the other users adds to the thermal noise to exacerbate the detection and acquisition problem.

ordinary prior-art approaches to the acquisition problem are based mainly on correlation or matched filtering operations performed on the received signal, variants of which are termed sliding correlation, serial search, and recursion aided sequential estimation. In the presence of a signal, many of these techniques ultimately generate a signal correlation or autocorrelation function, the peak of which should indicate signal timing. However, the noise and other interferences associated with the signal may make determination of the correlation peak difficult. Frequency errors or cumulative phase errors between the information carrier and the local frequency will tend to decrease the magnitude and increase the spread of the peak correlation.

A standard technique for acquisition of signals in the presence of frequency errors or frequency shifts is to use frequency bin searching, either by use of a plurality of correlators operating in parallel, one for each frequency of the received signal, or by searching frequency serially, or both. The use of one correlator for each possible frequency requires a great deal of hardware (or equivalent software), but provides fast acquisition. Serial searching of the frequencies requires only one correlator, but may require significant time to complete a search, especially considering that each attempted correlation may take as long as the recurrence period of the spreading code. Thus, there is a tradeoff between speed and complexity; two correlators could be used in parallel to search using various different frequency hypotheses, thereby presumably cutting the search time in half (by comparison with a single comparator using serial search) by a doubling of the complexity of the equipment.

Correlation or filtering is well known, and can be implemented by many techniques, as for example by Finite Impulse Filters (FIR) or by use of Fast Fourier Transforms (FFT).

Improved techniques for determination of the presence of spread-spectrum signals, or of the frequency andor time of spread-spectrum signals, is desired.

SUMMARY OF THE INVENTION

A method according to the invention is for acquisition, which may be in the presence of Doppler shift, of a received message with at least a preamble encoded by a pseudorandom spreading code or other identifiable code sequence. The method includes the step of generating a plurality of different phases of the spreading code. The different phases of the spreading code may be stored in memory for later use, if desired. A plurality of the different phases of the spreading code are summed together or linearly superposed, to thereby produce summed PRN code signals. If desired, the summed PRN code signals may be stored for later use, together with (or instead of) the different phases of the spreading code. The incoming spreading code is correlated with the summed PRN code signals, to thereby generate a cross-correlation signal. The cross-correlation signal indicates whether (or if) the desired phase is among those phases in the summed PRN code signals. If the cross-correlation signal indicates that the desired phase is among those phases in the summed PRN code signals, individual cross-correlations are performed between the incoming spreading code and those of the phases of the spreading code which make up the summed PRN code signals. This identifies the particular phase of the spreading (or other identifiable) code by which the message should be decoded.

A particularly advantageous mode of the method according to the invention includes the further step, after the correlating step, of determining if (a) the cross-correlation signal indicates that the desired phase is among those phases in the summed PRN code signals and (b) the number of different phases in the summed PRN code signals exceeds a particular number, and if both conditions exist, dividing the summed PRN code signals into at least two portions, each having fewer different phases than the particular number, and performing the step of correlating the incoming spreading code with at least one of the portions.

DESCRIPTION OF THE INVENTION

Figure 1:
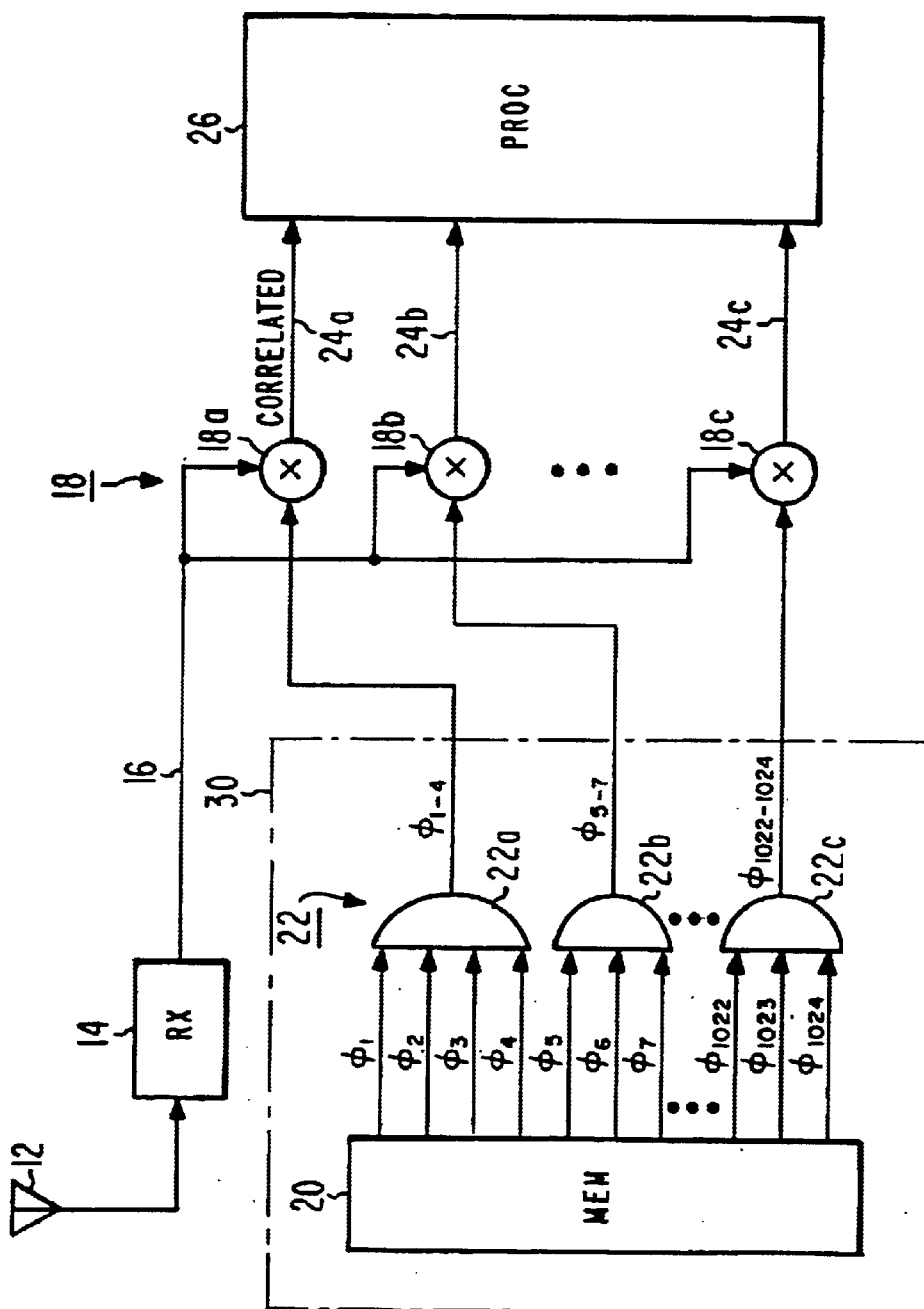
FIG. 1 is a simplified block diagram of an embodiment of the invention.

In FIG. 1, a receiver designated generally as 10 is intended to receive and decode or demodulate a message from a remote source, which is encoded with a recurrent pseudorandom spreading sequence or code, or which includes a unique- or identifiable-word header code. Receiver 10 includes an antenna 12. Signal received by antenna 12 is applied to a receiver illustrated as a block 14, which performs ordinary receiver functions, such as, for example, low-noise amplification, filtering, and frequency downconversion, so as to enable further processing. The signals processed by receiver 14 are applied over a signal path illustrated as 16, in parallel (or in common) to a bank or array 18 of a plurality, illustrated as being three in number, of multipliers 18a, 18b, and 18c. Multipliers 18a, 18b, and 18c also receive individual signals at their input ports from a memory arrangement, illustrated as a memory 30.

According to an aspect of the invention, memory 30 is preprogrammed with summed sequences of the spreading or header code, differing from each other in phase. Suppose that the spreading code for a spread-spectrum transmission is a sequence of 1024 chips, so that each bit or symbol of the message is encoded with a 1024-chip code. In order to properly decode or demodulate the message bits, the 1024-chip decoding sequence must be in-phase with the received sequence. Since there are 1024 chips in the spreading sequence, there are 1024 possible phase conditions which the received sequence can assume relative to the local sequence, and only one of those sequences is the correct sequence, which will properly decode the message sequence. The remaining 1023 possible phase conditions are out-of-phase and will not properly decode the message sequence. Since there is no a priori synchronization between the local sequence and the received sequence, it is very unlikely that the local decoding sequence will be in the phase for correct decoding of the message.

In one possible arrangement, memory 30 may include a memory 20 which is preprogrammed with a plurality, as for example 1024, of spreading codes, each of different phase, which is to say that each code sequence is offset in time by one chip relative the previous and the following code sequences. Thus, memory 20 will have 1024 output ports, one for each phase ($\phi$) of the sequence. As illustrated in FIG. 1, the outputs of memory 20 include phases $\phi_1$, $\phi_2$, $\phi_3$, $\phi_4$, $\phi_5$, $\phi_6$, $\phi_7$, . . . , $\phi_{1022}$, $\phi_{1023}$, and $\phi_{1024}$ of the sequence. As illustrated within block 30 of FIG. 1, a set 22 of adders or summing circuits is connected to the output ports of memory 20. Each adder 22a, 22b, . . . , 22c of set 22 of adders is illustrated as having four input ports, which are connected to the output ports of memory 20 in contiguous sets of four. Thus, summing circuit 22a is connected to phases $\phi_1$, $\phi_2$, $\phi_3$, and $\phi_4$ of memory 20, summing circuit 22b is connected to phases $\phi_5$, $\phi_6$, $\phi_7$, and to one additional phase which is not illustrated. Similarly, summing circuit 22c has its four input ports connected to the output ports of memory 20 associated with phases $\phi_{1022}$, $\phi_{1023}$, and $\phi_{1024}$, and with an additional phase (not illustrated). Thus, for four-input-port adders and for a sequence of 1024 chips, there will be a total of 256 adders in set 22, and the output sum of each adder represents the superposition or sum of four of the phase-offset codes. More particularly, the output of adder 22a represents the sum of phases $\phi_{1-4}$, the output of adder 22b represents the sum of phases $\phi_{5-8}$ . . . , and the output of adder 22c represents the sum of phases $\phi_{1021-1024}$. While each adder of set 22 has been described as summing the code sequence of four contiguous phases, there is no absolute requirement that the phases be contiguous, but they may instead be randomly selected (although not duplicated). The set 22 of adders in conjunction with multiphase code memory 20 provides the same effect as overall memory 30, which is to produce sums of various different phases of the known spreading code or unique word.

According to an aspect of the invention, the received message, including the received sequence which is to be synchronized to, is correlated in the multipliers or correlators of set 18 with the summed signals from memory 30 (or equivalently from the summing circuits of set 22). More particularly, multiplier 18a receives the received signal over path 16 and the sum of phases $\phi_{1-4}$, multiplier 18b receives the received signal over path 16 and the sum of phases $\phi_{5-8}$, . . . , and multiplier 18c receives the received signal over path 16 and the sum of phases $\phi_{1021-1024}$. Since, for a 1024-chip spreading or unique-word code, there are 256 four-input adders in set 22, and there is one multiplier in set 18 for each adder in set 22, there are 256 multipliers in set 18. Different numbers of inputs of the adders, or a different-length codeword, will change the requisite number of multiplier elements. Since the received signal has the spreading or unique-word code in only one phase, the correlations of the received signal with most of the sums will not result in any indication of correlation at the outputs of the multipliers (although there may be various partial correlations). However, the sum signal applied to one of the multipliers will be in-phase with the received signal, and that particular multiplier will produce a strong indication of correlation. Those skilled in the art know that the correlation of a binary word of 1024 chips or bits length results, in principle, in a peak output word at maximum correlation which has a value of 1024. In this particular case, there are three other "random" or uncorrelated signals present together with the one which is in-phase with the received signal. These additional words add a noise floor on which the desired correlation is superposed. Thus, it is conceptually simple to determine that one of the sums in which the phase of one of the plural different-phase versions of the "local" code occurs, because it is the only one which is likely to display a peak value in excess of a given value. The noise level and the magnitudes of stray peaks will depend on cross-correlation properties of the set of out-of-phase codes.

Processor 26 of FIG. 1 examines the correlations from each of the correlators of set 18, and determines the presence of the correct phase at the output of one of the summing circuits. This may be accomplished in a variety of ways, all of which are embodiments of the present invention. For example, the correlation value with largest magnitude may be used to determine the presence of the correct phase. In another embodiment, determination of the correct phase may be made only if the re-correlation is performed until the threshold is exceeded. Other embodiments are apparent to those with ordinary skill in the art. In any case, the presence of the correct phase at the output of one of the summing circuits is determined (with high probability). However, this knowledge narrows the field in which the correct phase is to be found, but does not identify that one of the phases which is in-phase with the received code. More particularly, in the example in which the code sequence has 1024 chips and the summers 22 produce sums of four sequences, the field is narrowed from 1024 to four. According to an aspect of the invention, those code sums which are deemed not to contain the desired phase of the code are discarded for the current determination, and the remaining sum (or sums, in some cases) are split into portions, so that each sum contains less than the number of phases of code than it previously contained, and the correlation is performed again. In some cases, the received signal may include a repetition of the unique word or the spreading code, so that the next correlation can be performed on a newly received signal. In other cases, it may be necessary to store the header or preamble of the received signal, and to use the stored information repeatedly to obtain the desired information. However accomplished, the received signal is again correlated with the sum, which now represents fewer different phases of the code. Processor 26 again evaluates the results of the correlation, and determines, among the remaining sums, which ones do not contain the desired phase of code, and identifies that one (or those, in some cases) which contain the code. The process is repeated, until the number of different versions or phases of code in the sum containing the correct version is small enough so that they may efficiently be individually correlated with the received signal. When the particular one of the spreading or unique-word codes is identified, it is then used to perform the decoding of the received message.

Figure 2:
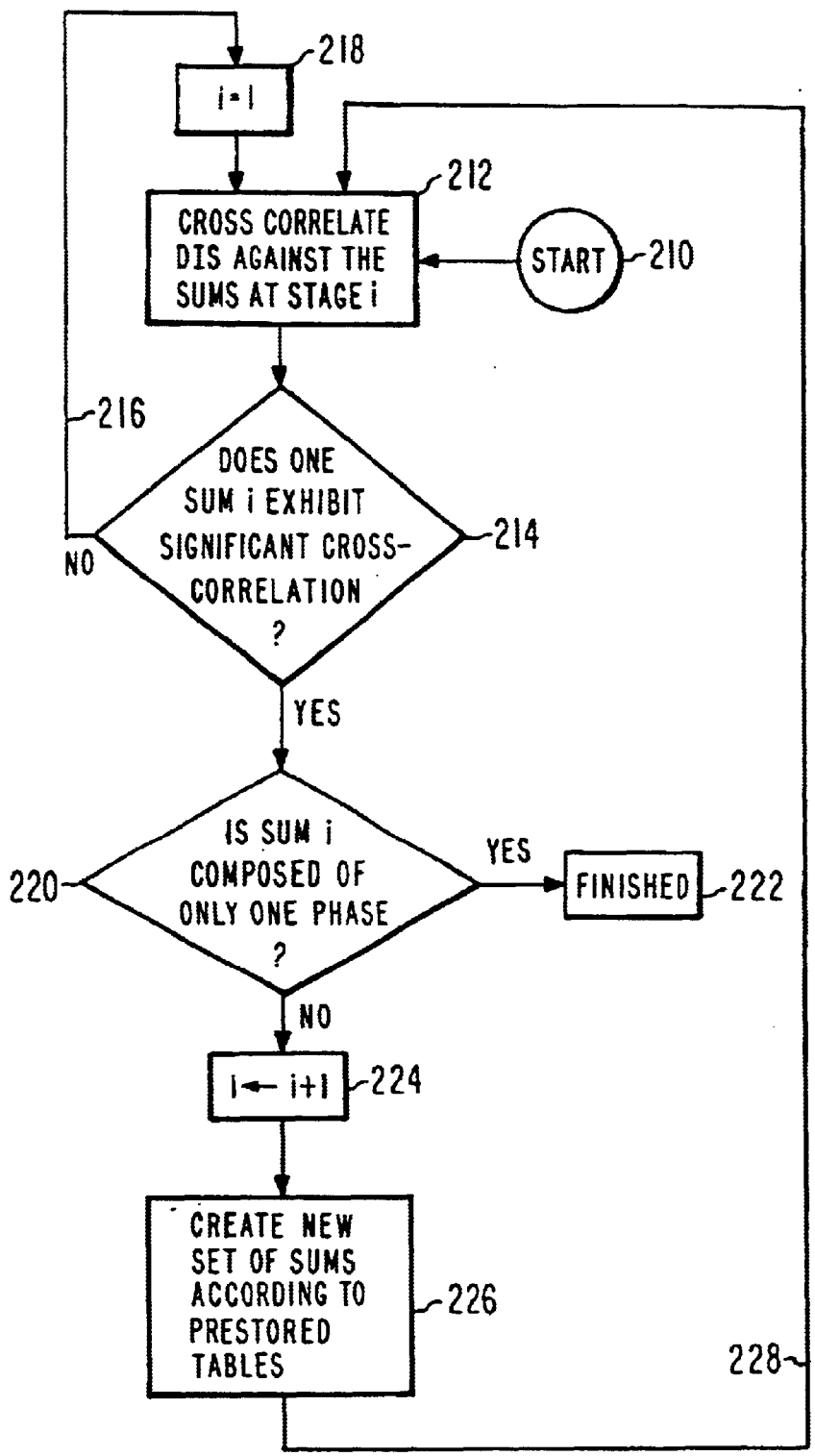
FIG. 2 is a simplified flow chart or graph illustrating the logic flow of the processor of FIG. 1.

FIG. 2 is a simplified flow chart or graph illustrating the operation of the processor 26 of FIG. 1 in performing the method of the invention. Before describing the logic flow, it should be understood that in a preferred embodiment of the invention, memory 30 is preloaded with the various sums of different phases of the spreading or unique-word code, so no actual logic (such as set 22 of summers) is required to generate the sums. All that is necessary is to specify which of the stored sums is (are) to be presented for correlation. In FIG. 1, the logic starts at a START block 210, and flows to a further block 212, which represents cross-correlation of the received sequence with the memorized sums at stage i, which for the first iteration is unity. From block 212, the logic flows to a decision block 214, which determines if one of the sums exhibits significant cross-correlation. If not, the logic flows from the NO output of decision block 214, by way of a logic path 216, back to a block 218, which resets i to equal unity. If one (or more) of the sums exhibits significant correlation, the logic leaves decision block 214 by the YES output, and arrives at a further decision block 220. Decision block 220 determines if the sum in which correlation was found contains only one phase. If so, the logic leaves decision block 220 by the YES output, and arrives at a FINISHED block 222. The desired phase is the one in the current sum.

On the other hand, if the sum in which decision block 220 of FIG. 2 found significant correlation contains more than one phase of the spreading or unique-word code, the logic leaves decision block 220 by the NO output, and proceeds to a block 224. Block 224 represents the incrementing of index i to (i+1). From block 224, the logic flows to a further block 226, which represents the commanding of memory 30 (FIG. 1) to output a new set of sums. This new set of sums is selected from that one set (or possibly a plurality of sets) which exhibited correlation, and so the new set of sums must presumably contain the desired-phase sequence. The $(i+1)^{th}$ set of sums includes fewer individual phases of the code than the $i^{th}$ set, and therefore each sum contains fewer different-phase codes. From logic block 226, the logic of FIG. 2 flows by way of a logic path 228 back to block 212, to begin another iteration. The iterations continue until, eventually, the remaining sum contains only a single phase, at which time decision block 220 directs the logic to FINISHED block 222. The desired phase is the one identified by decision block 220. As mentioned above, this phase can then be read from memory 30 (FIG. 1) and applied for decoding of the spreading sequence or identification of the timing of a unique word.

Other embodiments of the invention will be apparent to those skilled in the art. For example, while the signal has been illustrated as received by an antenna, other transducers may be used, such as photodiodes, particle detectors, and the like. While a single memory 20 has been illustrated as containing all of the summed codes, individual memories could be used, or the memory (not illustrated) of processor 22 could be used to store the summed codes. As mentioned, each adder of set 22 has been described as summing the code sequence of four contiguous phases, but there is no absolute requirement that the phases be contiguous, but they may instead be randomly selected (although not duplicated). Similarly, there is no particular reason that the summers of set 22 each sums four sequences, increasing the number of sequences summed in each adder reduces the total number of adders required for a given code length, but results in a larger number of codes in each sum, which may require more iterations to identify the desired phase.

Other embodiments of the basic invention could include techniques for dealing with unknown frequency shifts in the received signal, as caused by Doppler shift, for example. Standard techniques such as serial and/or parallel correlations over multiple frequency bins may be employed in such cases, as is apparent to those with ordinary skill in the art.

Thus, a receiver (10) for a unique word sequence or a spreading code sequence includes a memory (30) which is preloaded with all possible phases of the code. The sequence in the received signal (on signal path 16) is correlated, in parallel (in correlation set 18), with sums of various ones of the different phases of the code. Thus, the received code is correlated with all possible phases of a replica of its own code. Consequently, one of the sums will exhibit a correlation peak, which indicates that the desired phase of the code is included in that particular sum. The other sums will not exhibit a correlation peak, and are discarded. The different phases in the one sum which displayed correlation are divided into new sums, each having fewer phases, and the correlation is again performed. Again, those sums exhibiting no correlation are discarded, and the sum exhibiting correlation is divided into sums of fewer codes. The process in continue until that one of the sums exhibiting correlation contains only one phase of the code, and it is perforce the one with the desired phase. The in-phase code is used to decode the received code.

Yet another embodiment of the invention may be apparent to those skilled in the art. will not be synchronous relative to the chip In many real-world systems, the received signal boundaries. Thus, in order to ensure that adequate correlation peaks are attained, one may correlate with all phases of the spreading code offset by one-half of the chip duration. Finer offsets may also be employed if desired.

What is claimed is:

1. A method for acquisition of a received message including at least a portion encoded by an identifiable incoming code sequence, said method comprising the steps of:

generating a plurality of different phases of said code sequence;

summing together a plurality of said code sequences of different phases, to produce summed code signals;

correlating said incoming code sequence with said summed code signals, to thereby generate a cross-correlation signal which indicates the presence of the desired phase of said code sequences among those phases in said summed code signals;

if said cross-correlation signal indicates that said desired phase is among those phases in said summed code signals, performing individual cross-correlations between said incoming code sequence and those of said phases of said code sequence which make up said summed code signals, to thereby identify that one of said different phases of said code sequence by which said message should be decoded.

2. A method according to claim 1, further comprising the step, after said step of correlating, of:

if said cross-correlation signal indicates that said desired phase is among those phases in said summed code signals and the number of different phases in said summed code signals exceeds a particular number, dividing said summed code signals into at least two portions, each having fewer different phases than said particular number; and repeating said step of correlating said incoming code sequence with at least one of said portions.

3. A method according to claim 1, wherein said step of generating a plurality of different phases of said code sequence includes the step of pregenerating said different phases of said code sequence, and storing said different phases of said code sequence in a memory for later access.

4. A method according to claim 1, wherein said step of summing includes the step of superposing a plurality of said different phases of said code sequence, and storing said summed code signals.

5. A method according to claim 1, wherein said portion encoded by an identifiable incoming code sequence includes a preamble, and comprising the further step of:

decoding at least said preamble of said message with that one of said phases of said code sequence which make up said summed code signals which, in said step of performing individual cross-correlations, resulted in the greatest correlation.

6. A method for acquisition of a received message including a preamble encoded by a pseudorandom spreading code, said method comprising the steps of:

generating a plurality of different phases of said spreading code;

summing together a plurality of said different phases of said spreading code, to produce summed PRN code signals;

correlating said pseudorandom spreading code with said summed PRN code signals to thereby generate a cross-correlation signal which indicates the presence of the desired phase among those phases in said summed PRN code signals;

if said cross-correlation signal indicates that said desired phase is among those phases in said summed PRN code signals, performing individual cross-correlations between said pseudorandom spreading code and those of said phases of said spreading code which make up said summed PRN code signals.

7. A method according to claim 6, further comprising the step, after said step of correlating, of:

if said cross-correlation signal indicates that said desired phase is among those phases in said summed PRN code signals and the number of different phases in said summed PRN code signals exceeds a particular number, dividing said summed PRN code signals into at least two portions, each having fewer different phases than said particular number; and repeating said step of correlating said incoming spreading code with at least one of said portions.

8. A method according to claim 6, wherein said step of generating a plurality of different phases of said spreading code includes the step of pregenerating said different phases of said spreading code, and storing said different phases of said spreading code in a memory for later access.

9. A method according to claim 6, wherein said step of summing includes the step of superposing a plurality of said different phases of said spreading code, and storing said summed PRN code signals.

10. A method according to claim 6, comprising the further step of:

decoding at least said preamble of said message with that one of said phases of said code sequence which make up said summed code signals which, in said step of performing individual cross-correlations, resulted in the greatest correlation.

11. A method for acquisition of a received message including at least a portion encoded by an identifiable code sequence, said method comprising the steps of:

generating a plurality of different phases of said code sequence;

summing together a plurality of said code sequences of different phases, to produce plural sets of summed code signals;

correlating said identifiable code sequence with each of said sets of said summed code signals, to thereby generate cross-correlation signals which indicates the presence of the desired phase of said code sequences among those phases in one of said sets of said summed code signals;

discarding from further consideration those sets of said summed code signals which said cross-correlation signal indicates does not contain said desired phase;

if said cross-correlation signal indicates that said desired phase is among those phases in a particular set of said summed code signals, and the number of different individual phases in said particular set of said summed code signals is greater than a particular number, dividing said particular set into a plurality of smaller sets, each containing fewer different phases than said particular set, and repeating said step of correlating said identifiable code sequence with each of said remaining sets of said summed code signals, discarding from further consideration, and dividing, until said number of different phases in said particular step is no greater than said particular number; and performing individual cross-correlations between said identifiable code sequence and those of said phases of said code sequence which make up the remaining one of said summed code signals, to thereby identify that one of said different phases of said code sequence by which said message should be decoded.

12. A method according to claim 11, further comprising the step of:

after said step of performing individual cross-correlations and identifying that one of said different phases of said code sequence by which said message should be decoded, decoding at least a portion of said message with the identified one of said phases of said code sequence.

* * * * *